United States Patent
Koster et al.

(10) Patent No.: US 10,901,901 B2
(45) Date of Patent: Jan. 26, 2021

(54) DEPLOYMENT OF PROCESSING ELEMENTS IN NON-UNIFORM MEMORY ACCESS ENVIRONMENTS

(71) Applicant: International Business Machines Corporation, Armonk, NY (US)

(72) Inventors: David M. Koster, Rochester, MN (US); John M. Santosuosso, Rochester, MN (US); Christopher R. Sabotta, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/033,526

(22) Filed: Jul. 12, 2018

(65) Prior Publication Data
US 2020/0019504 A1   Jan. 16, 2020

(51) Int. Cl.
*G06F 12/00* (2006.01)
*G06F 12/0817* (2016.01)
*G06F 3/06* (2006.01)

(52) U.S. Cl.
CPC ........ *G06F 12/0828* (2013.01); *G06F 3/0622* (2013.01); *G06F 3/0655* (2013.01); *G06F 3/0673* (2013.01); *G06F 2212/621* (2013.01)

(58) Field of Classification Search
CPC .. G06F 12/0828; G06F 3/0622; G06F 3/0673; G06F 3/0655; G06F 2212/621; G06F 2209/501; G06F 9/5038; G06F 2212/1024; G06F 12/0815; G06F 2212/2542

USPC ........................................................ 711/141
See application file for complete search history.

(56) References Cited

U.S. PATENT DOCUMENTS

| 8,966,491 | B2 | 2/2015 | Calciu et al. |
| 9,426,211 | B2 | 8/2016 | Garg et al. |
| 2014/0237069 | A1* | 8/2014 | Gray ............... G06F 3/061 709/214 |

OTHER PUBLICATIONS

Disclosed Anonymously, Cache Coherent Multiprocessor Computer Systems with None Cache Coherent Load/Store Instructions, IP.com No. IPCOM000203265D, Jan. 21, 2011.
IBM, System and Method for Developing Non Uniform Memory Architectures (NUMA) Testing Procedures and Applications, IP.com No. IPCOM000028719D, May 27, 2004.
Disclosed Anonymously, Method of Testing Shared Caches/TLB Intervention, IP.com No. IPCOM000241210D, Apr. 3, 2015.
(Continued)

*Primary Examiner* — Mardochee Chery
(74) *Attorney, Agent, or Firm* — Martin & Associates, LLC; Derek P. Martin (57) ABSTRACT

A deployment manager deploys processing elements of a streaming application in a non-uniform memory access (NUMA) aware manner to reduce memory coherency overhead in a streaming application. The deployment manager is able to utilize information about an application's operators and the architecture of the NUMA nodes to place whole processing elements on a single NUMA node. Where the operators of a processing element would cross NUMA node boundaries, the deployment manager may consolidate the threads of a processing element to place an application's operators on a single NUMA node to increase efficiency of the system.

19 Claims, 5 Drawing Sheets

(56) References Cited

OTHER PUBLICATIONS

Francesquini et al., Improving the Performance of Actor Model Runtime Environments on Multicore and Manycore Platforms, Grenoble Informatics Laboratory, University of Grenoble, Nov. 14, 2013.

Gordon, Steve, Driving in the Fast Lane—CPU Pinning and NUMA Topology Awareness in OpenStack Compute, Red Hat Stack Blog, May 5, 2015.

Arcangeli, Andrea, NUMA Aware Scheduler Extensions, printed from http://lse.sourceforge.net/numa/scheduler/ on Jun. 26, 2018.

* cited by examiner

DEPLOYMENT OF PROCESSING ELEMENTS IN NON-UNIFORM MEMORY ACCESS ENVIRONMENTS

BACKGROUND

1. Technical Field

This disclosure generally relates to computer processing, and more specifically relates to a system and method for deploying processing elements in non-uniform memory access environments to reduce cache-coherency issues and improve overall application performance of a streaming application.

2. Background Art

Streaming applications are often processed on a computer system with several computers connected in a cluster. Computers in the cluster are often multiprocessor computers with different architectures. Multiprocessor computers often use non-uniform memory access (NUMA) where the memory access time depends on the memory location relative to the processor. These computer systems typically use a small amount of very fast non-shared memory known as cache memory to exploit locality of reference in memory accesses to increase efficiency. However, maintaining cache coherence across shared memory of different processors requires significant overhead.

To maintain cache coherence, many multiprocessor systems use cache coherence NUMA (ccNUMA). Typically, ccNUMA systems use inter-processor communication between cache controllers to keep a consistent memory image when more than one cache stores the same memory location on the same or a different node. Synchronization of memory used by processing elements located on a different node of the computer system can be very costly to system performance.

BRIEF SUMMARY

A deployment manager deploys processing elements of a streaming application in a non-uniform memory access (NUMA) aware manner to reduce memory coherency overhead in a streaming application. The deployment manager is able to utilize information about an application's operators and the architecture of the NUMA nodes to place whole processing elements on a single NUMA node. Where the operators of a processing element would cross NUMA node boundaries, the deployment manager may consolidate the threads of a processing element to place an application's operators on a single NUMA node to increase efficiency of the system.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a system and method for deploying processing elements of a streaming application in a non-uniform memory access (NUMA) aware manner to reduce memory coherency overhead in a streaming application. The deployment manager is able to utilize information about an application's operators and the architecture of the NUMA nodes to place whole processing elements on a single NUMA node. Where the operators of a processing element would cross NUMA node boundaries, the deployment manager may consolidate the threads of a processing element to place an application's operators on a single NUMA node to increase efficiency of the system.

Figure 1:
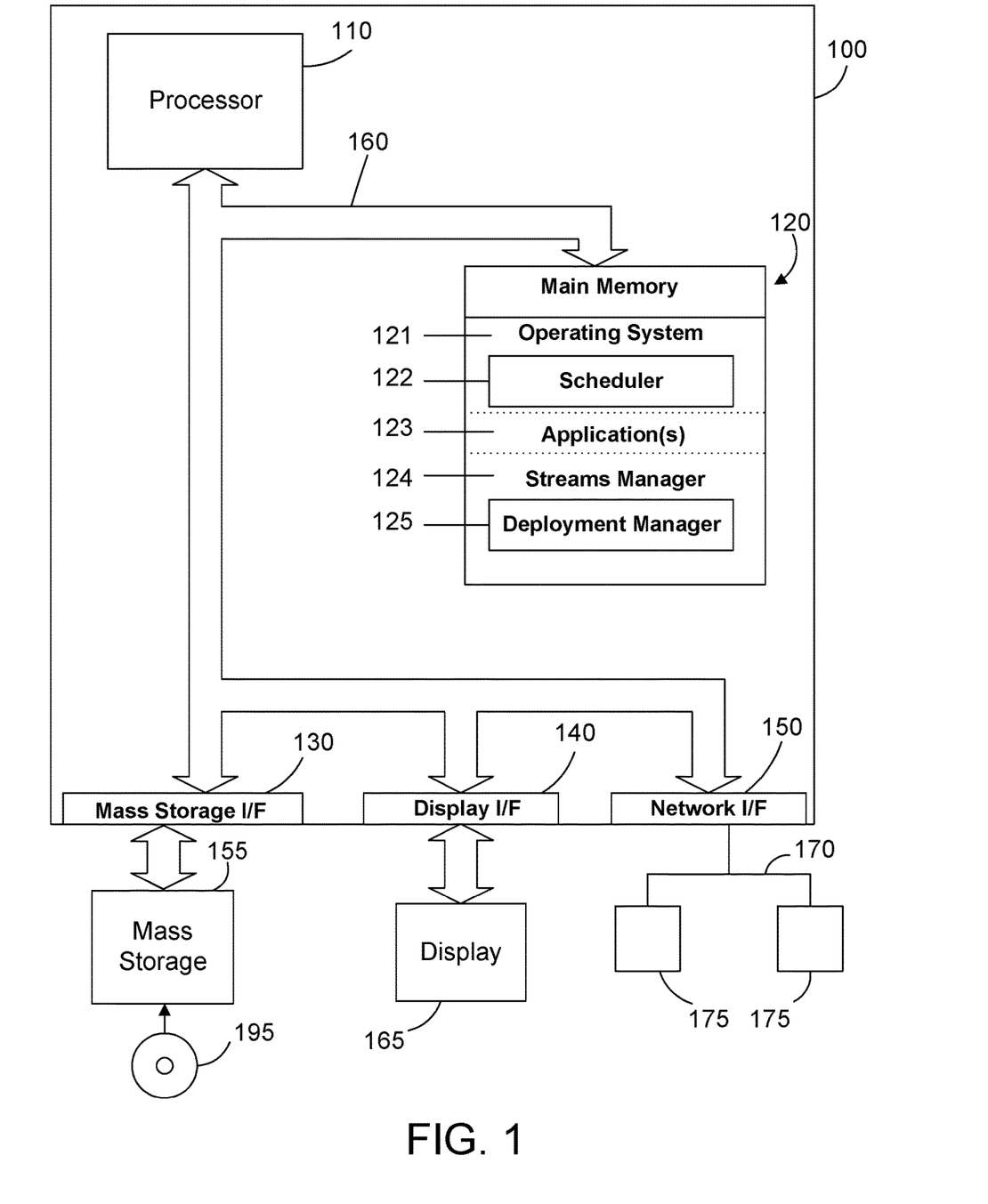
FIG. 1 is a block diagram a computer system with a deployment manager that deploys processing elements of a streaming application in a non-uniform memory access (NUMA) aware manner to reduce memory coherency overhead in a streaming application.

Referring to FIG. 1, a computer system 100 is one suitable implementation of a computer system that is capable of performing the computer operations described herein including deploying processing elements of a streaming application in a non-uniform memory access (NUMA) aware manner as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The operating system 121 includes a scheduler 122 for deploying applications in NUMA nodes as described further below. The memory 120 further includes one or more applications 123. The memory 120 also includes a streams manager 124 that includes a deployment manager 125. The deployment manager 125 deploys processing elements of the applications in the NUMA node as described further below. The deployment manager 125 may deploy the processing elements through instructions to the scheduler 122.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, scheduler 122, applications 123, streams manager 124, and the deployment manager 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the applications 123 as directed by a user and the streams manager 124.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figures 2, 3:
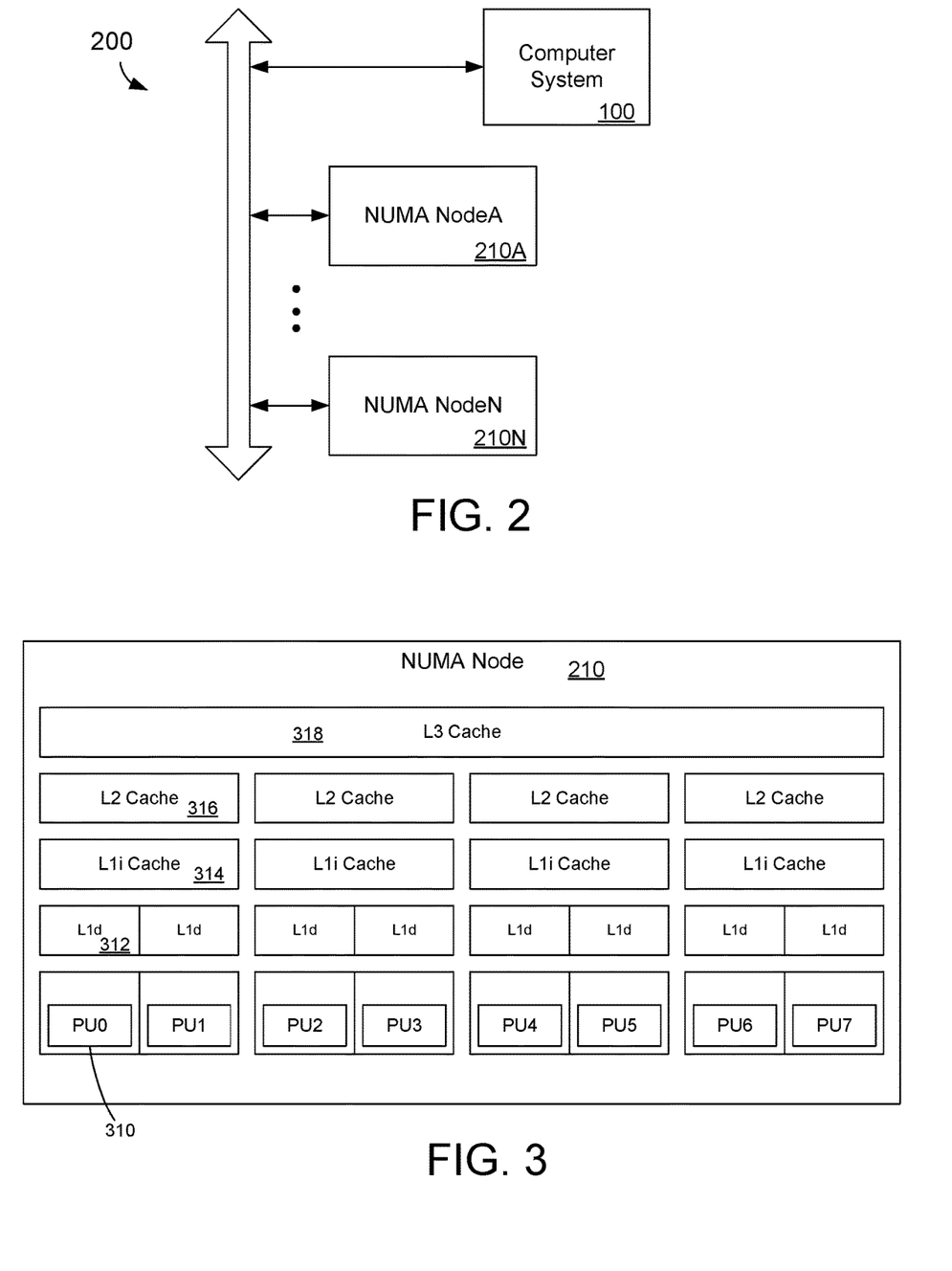
FIG. 2 illustrates a simplified block diagram of a cluster computer system having multiple NUMA nodes.
FIG. 3 is block diagram of a NUMA node in the cluster computer system.

FIG. 2 illustrates a simplified block diagram of a cluster computer system 200 that includes a deployment manager for deploying processing elements of a streaming application in a non-uniform memory access (NUMA) aware manner to reduce memory coherency overhead in a streaming application as described herein. The cluster computer system 200 has a computer system 100 as described above that includes the deployment manager 125 introduced in FIG. 1. The deployment manager 125 described herein is preferably a component of the streams manager 124. The cluster computer 200 further has one or more NUMA nodes for processing the application. In the illustrated example, the cluster computer has a number of NUMA nodes indicated by NUMA nodeA 210A through NUMA nodeN 210N (collectively NUMA nodes 210).

FIG. 3 illustrates a simplified block diagram of a NUMA node 210 introduced in FIG. 2. The NUMA node 210 represents a computer processing node that is part of a cluster computer or cloud computing system. In this example, the NUMA node 210 has eight processors 310 (PU0 through PU7). Each of the processors in this example has a unique level 1 data cache 312. Each set of two processors 310 have a level 1 instruction cache 314 and a level 2 data cache 316. A level three cache 318 serves all the processors in the NUMA node 210. The NUMA nodes in a cluster or cloud may not all have the same number of processors or the same NUMA characteristics and architecture. The deployment manager 125 deploys operators to each NUMA node depending on the node's processor set and individual characteristics.

As described herein, the deployment manager in conjunction with the operating system deploys a streaming application to a number of NUMA nodes for execution. As used herein, the term streaming application means an application or program that processes data that may be provided to the application in a continuous data stream. The streaming application processes input data in the form of tuples. A tuple is an individual piece of data in the data stream. Typically, the data in a tuple represents the state of something at a specific point in time. For example, the tuple may represent a stock ticker quote or a temperature reading from an individual sensor. The data stream is thus a running sequence of tuples. Multiple streams and operators that are deployed can be represented in a dataflow graph. When a streams processing application is compiled, the operators and streams relationships that make up the dataflow graph are broken down into one or more individual execution units that are known as processing elements. As used herein an operator is any basic functional block that acts on data (tuples) in flight. Thus, an operator is a portion of an application processing element that manipulates the tuple data from the incoming stream and produces the results in the form of an output stream. A thread refers to a standard fundamental processing thread that is typically defined as a sequence of program instructions that is managed by a scheduler. The streams manager 124 typically breaks up the operators into threads. An operator may be deployed as multiple threads, or a single thread. Alternatively, there may be multiple operators deployed on a single thread. In general the streams manager seeks to have as many threads as can be supported by the hardware concurrently running to maximize throughput. Threads may be assigned to processor cores by the streams manager 124 in conjunction with the deployment manager 125 as described herein. The thread to core assignments may be accomplished with an application programming interface (API) or the thread can be broken down into appropriate sized chunks such that the operating system will appropriately place the threads using default settings of the operating system.

Figure 4:
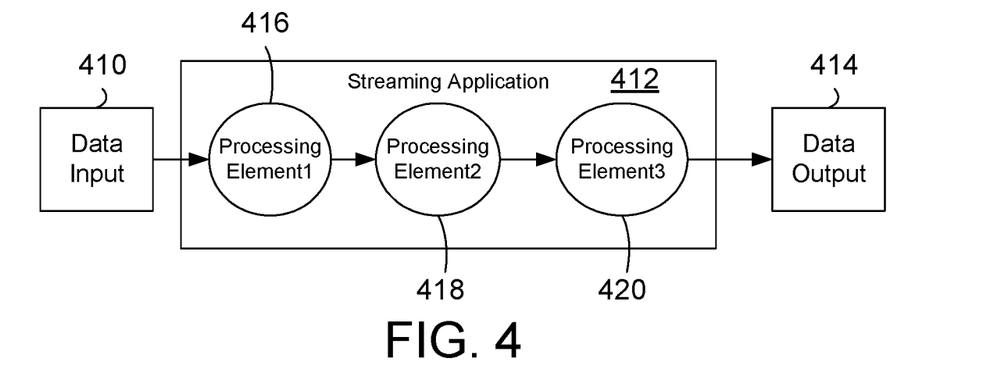
FIG. 4 is block diagram of a streaming application for deployment in the cluster computer system.

FIG. 4 illustrates a block diagram of data flow in a streaming application 412 for deployment in the cluster computer system. The streaming application 412 inputs data 410 and outputs data 414. The streaming application 412 is deployed to one or more nodes such as NUMA node 210 in a computer system such as a cluster computer or cloud. In this simplified example, the streaming application 412 has three processing elements, namely processing element1 416, processing element2 418, and processing element3 420. Processing element1 416 receives input data 410 and originates a stream of tuples, which is processed by processing element2, which outputs tuples. The tuples from processing element2 418 are processed by processing element3 420, which outputs tuples to the data output 414. Each of the processing elements 416, 418, 420 may contain one or more operators as described below.

Figure 5:
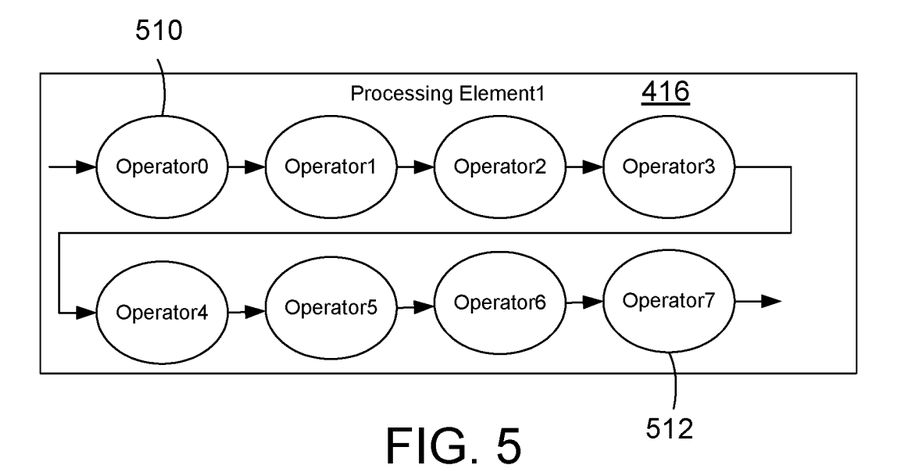
FIG. 5 is block diagram of a processing element for deployment in the cluster computer system.

FIG. 5 is block diagram of a processing element of an application for deployment in the cluster computer system. The processing element1 416 shown in FIG. 5 represents an example of processing element1 416 introduced in FIG. 4. In this example, processing element1 416 has eight operators, namely operator0 510 through operator7 512. The deployment manager 125 (FIG. 1) assists the streams manager to place the operators of a processing element on processing units of NUMA nodes such as shown in FIG. 3. Where possible, the deployment manager 125 (FIG. 1) will attempt to place whole processing elements on a single NUMA node with an operator or a thread of an operator on each processing unit. This is done because synchronization of memory used by processing elements located on a different node of the computer system can be very costly to system performance. In the example shown in FIG. 3, the NUMA node 210 has eight processing units (PU0 through PU7). Since the streams deployment manager has an awareness and control at a higher level than an operating system, the deployment manager is better able to optimize across multiple nodes than leaving the placement up to the operating system scheduler. The deployment manager determines how to break up the operators into threads and in conjunction with the streams manager 124 places the threads on the processors in such a way to place the entire processing element 416 on a single NUMA node 210.

Figure 6:
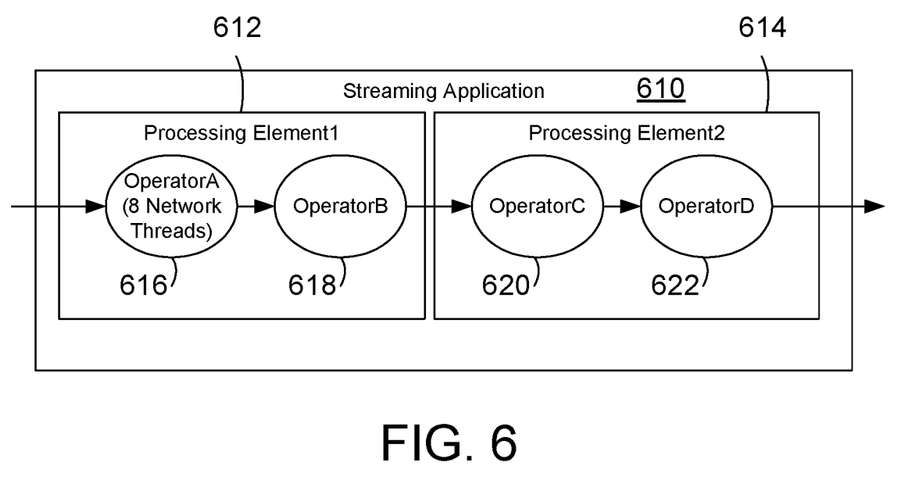
FIG. 6 is block diagram of an example of a streaming application for deployment in the cluster computer system.

FIG. 6 is an example of a streaming application that can be deployed in a cluster computer system. In this example, the streaming application 610 has two processing elements, namely processing element1 612 and processing element2 614. Processing element1 612 has two operators, namely operatorA 616 and operatorB 618. Processing element2 614 also has two operators, namely operatorC 620 and operatorD 622. In this example, processing element1 612 would normally need nine processing units, eight processing units for the network threads in operatorA 616 and one for operatorB 618. In this example, to deploy this streaming application 610, the deployment manager considers how it could arrange the work of this application on a NUMA system. The deployment manager gathers information about the operators of the application and information about the NUMA nodes and where possible places whole processing elements in a single NUMA node. Where a processing element cannot be placed in a single NUMA node with the standard placement, the deployment manager determines if consolidating threads can increase performance and places a consolidated processing element in a single NUMA node.

Again referring to FIG. 6, we will now consider how the deployment manager could handle placement of processing element1 612. Since the deployment manager is part of the streams manager which is at a higher logical level than a scheduler, the deployment manager is able to determine that the eight network threads are not sequential and could each be run on their own processing unit. In this case, the eight network threads would normally be placed in different processing units to maximize the speed of processing element1 612. The deployment manager could determine performance for this "standard" deployment of one thread or operator per processing unit. Performance could be estimated or determined in any appropriate way. For example, the streams manager naturally collects performance information as it runs. This performance information may include thread utilization, throughput, latency between NUMA nodes, and time spent processing per tuple gathered through basic time checks. In this case, the performance would include the performance loss in transporting data across a NUMA region since the processing element1 612 would require nine processing units on two NUMA nodes. For comparison, the deployment manager also determines performance of a "consolidated" deployment where the processing element1 612 is placed in a single NUMA node. In this second case, the deployment manager considers performance of the processing element when consolidating or merging one or more threads such that the processing element is able to be deployed within a single NUMA node. In this example, the deployment manager could force the eight network threads of operator 616 to be consolidated into seven processing units such that processing element1 612 could be deployed entirely on a single NUMA node. This could be done, for example, by having one thread perform the work of two of the eight threads in operator 616 so only seven threads are needed for operator 616. After the above calculations and estimates, the deployment manger could then deploy processing element1 612 on one or two NUMA nodes depending on which calculation or estimate yields the best performance. This calculation could be repeated and the deployment restructured during runtime as other network conditions/streams arrangements change. The deployment manager may deploy processing element1 612 as determined above by instructing the scheduler 122 (FIG. 1) to deploy the processing element.

Figure 7:
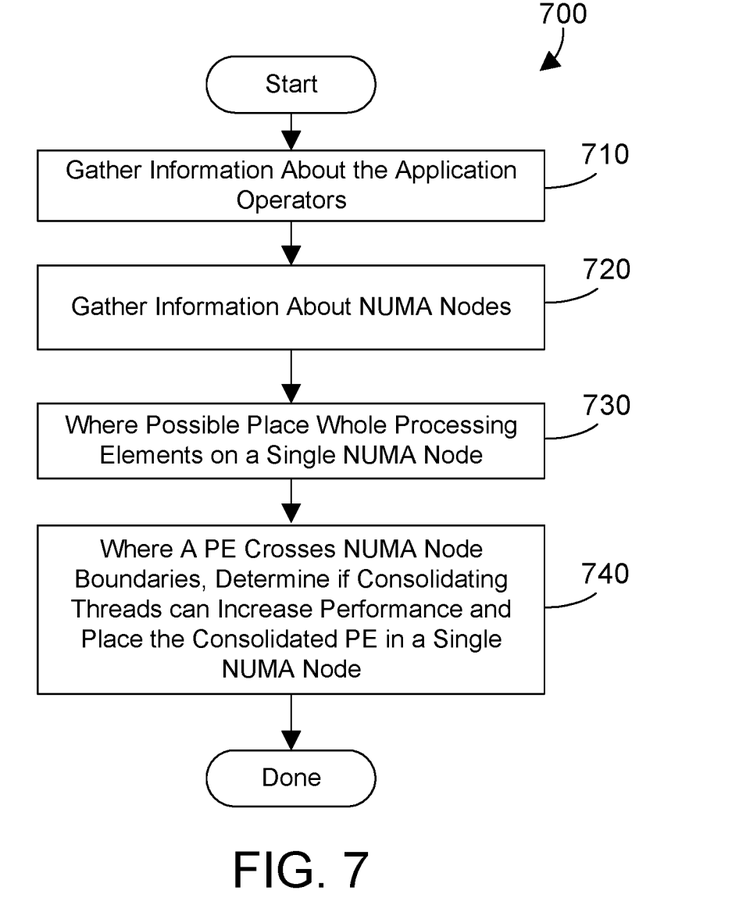
FIG. 7 is a flow diagram of a method for deploying processing elements of a streaming application in a NUMA aware manner.

Referring to FIG. 7, a method 700 shows one suitable example for deploying processing elements of a streaming application on NUMA nodes of a computer system. Portions of method 700 are preferably performed by the streams manager 124 and the deployment manager 125 shown in FIG. 1. First, gather information about the application operators (step 710). Next, gather information about the NUMA nodes (step 720). Where possible, place whole processing elements entirely within a single NUMA node (step 730). Where a processing element will cross NUMA node boundaries in step 730, determine if consolidating threads can increase performance and place the processing element with the consolidated thread in a single NUMA node (step 740). Method 700 is then done.

Figure 8:
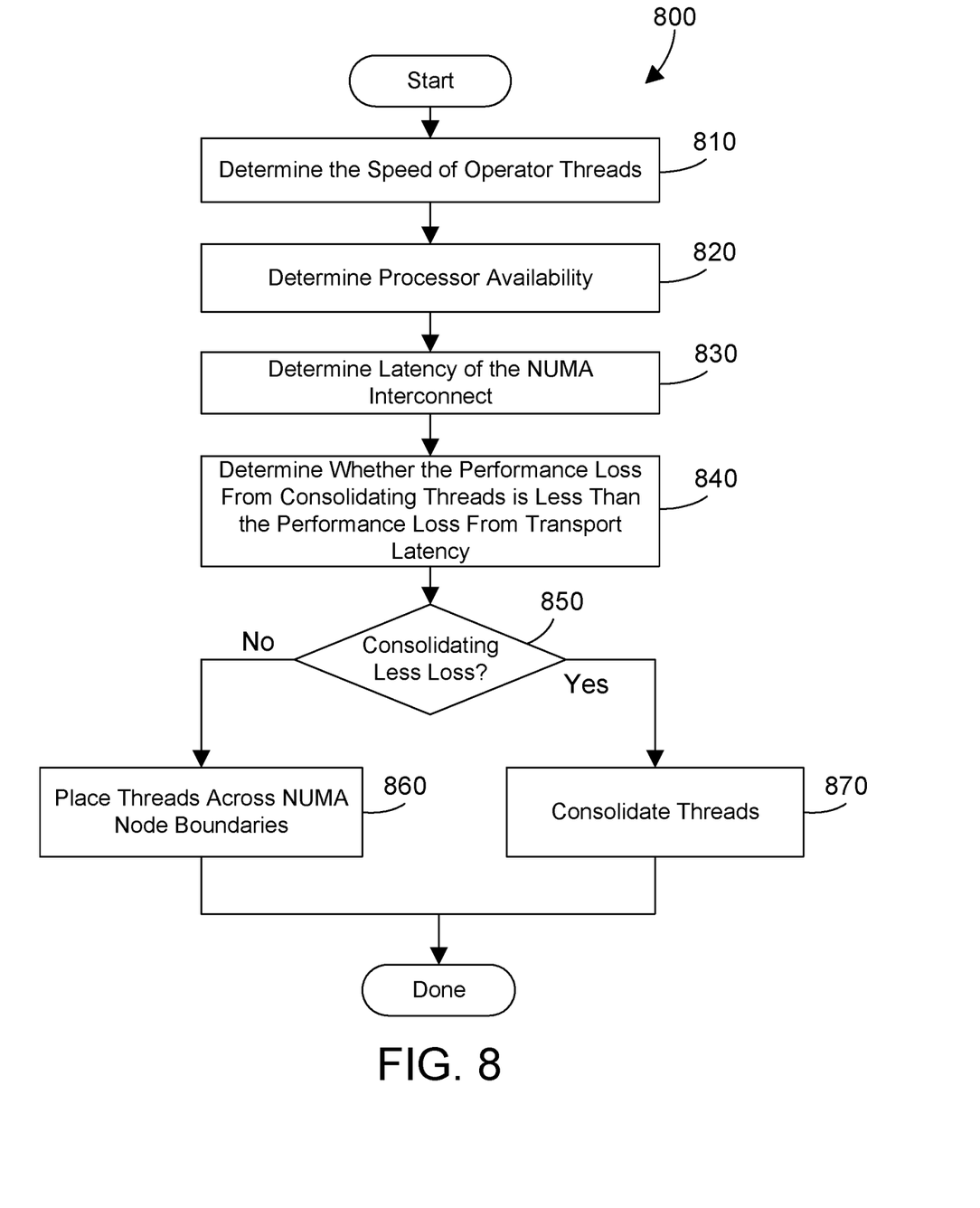
FIG. 8 is a flow diagram of another method for deploying processing elements of a streaming application in a NUMA aware manner.

FIG. 8 shows another suitable method 800 for deploying processing elements of a streaming application on NUMA nodes of a computer system. Portions of method 800 are preferably performed by the streams manager 124 and the deployment manager 125 shown in FIG. 1. Determine the speed of operator threads in the processing elements (step 810). Determine processor availability in the NUMA nodes (step 820). Determine the latency of the NUMA node interconnect (step 830). Determine whether the performance loss from consolidating threads is less than the performance loss from transport latency on the NUMA interconnect (step 840). If consolidating threads is not less loss (step 850=no) then place threads across NUMA node boundaries (step 860). If consolidating threads is less loss (step 850=yes) then consolidate threads (step 870). The method 800 is then done.

The claims and disclosure herein support an apparatus comprising: at least one processor; a memory coupled to the at least one processor; a streaming application having a plurality of processing elements with each processing element having a plurality of operators; a deployment manager residing in the memory and executed by the at least one processor that manages deployment of the plurality of operators to a plurality of a non-uniform memory access (NUMA) nodes; and wherein the deployment manager gathers information about the application and the NUMA nodes and seeks to place operators of whole processing elements on a single NUMA node; and where deployment of operators of a single processing element placed with threads in separate processors of the NUMA node would require the processing element to cross NUMA node boundaries, the deployment manager determines whether consolidating threads can increase performance, and in response to a determination of increased performance the deployment manger consolidates two or more operator threads of a processing element to place all operators of the single processing element on processors of a single NUMA node.

The claims and disclosure herein further support a computer-implemented method executed by at least one processor for deploying processing elements of a streaming application on a non-uniform memory access (NUMA) node comprising: gathering information of a streaming application having a plurality of processing elements with each processing element having a plurality of operators; seeking to place the operators of whole processing elements on a single NUMA node; where deployment of operators of a single processing element placed with threads in separate processors of the NUMA node would require the processing element to cross NUMA node boundaries, determining whether consolidating threads can increase performance; and in response to a determination of increased performance consolidating two or more operator threads of a processing element and placing all operators of the single processing element on processors of a single NUMA node.

The claims and disclosure herein additionally support a computer-implemented method executed by at least one processor for deploying processing elements of a streaming application on a non-uniform memory access (NUMA) node comprising: gathering information of a streaming application having a plurality of processing elements with each processing element having a plurality of operators, wherein the gathered information includes a speed of threads of the operators, processor availability on the NUMA nodes, and latency of the NUMA nodes interconnect; seeking to place the operators of whole processing elements on a single NUMA node; where deployment of operators of a single processing element placed with threads in separate processors of the NUMA node would require the processing element to cross NUMA node boundaries, determining whether consolidating threads can increase performance by determining whether a performance loss from consolidating threads is less than the performance loss from transport latency of the NUMA nodes interconnect; and in response to a determination of increased performance consolidating two or more operator threads of a processing element and placing all operators of the single processing element on processors of a single NUMA node.

A deployment manager deploys processing elements of a streaming application in a non-uniform memory access (NUMA) aware manner to reduce memory coherency overhead in a streaming application. The deployment manager is able to utilize information about an application's operators and the architecture of the NUMA nodes to place whole processing elements on a single NUMA node. Where the operators of a processing element would cross NUMA node boundaries, the deployment manager may consolidate the threads of a processing element to place an application's operators on a single NUMA node to increase efficiency of the system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a streaming application having a plurality of processing elements with each processing element having a plurality of operators;
a deployment manager residing in the memory and executed by the at least one processor that manages deployment of the plurality of operators to a plurality of a non-uniform memory access (NUMA) nodes; and
wherein the deployment manager gathers information about the application and the NUMA nodes and seeks to place operators of whole processing elements on a single NUMA node; and
when deployment of operators of a single processing element placed with threads in separate processors of the NUMA node requires the processing element to cross NUMA node boundaries, then the deployment manager determines whether consolidating threads can increase performance, and in response to a determination of increased performance the deployment manager consolidates two or more operator threads of a processing element to place all operators of the single processing element on processors of a single NUMA node.

2. The apparatus of claim 1 further comprising a streams manager residing in the memory and executed by the at least one processor that manages the streaming application.

3. The apparatus of claim 1 wherein the gathered information includes a speed of threads of the operators, processor availability on the NUMA nodes, and latency of the NUMA nodes interconnect.

4. The apparatus of claim 3 wherein the deployment manager determines whether consolidating threads can increase performance by determining whether a performance loss from consolidating threads is less than the performance loss from transport latency of the NUMA nodes interconnect.

5. The apparatus of claim 1 wherein, when the deployment manager determines consolidating threads does not increase performance, the deployment manager deploys the operators of the processing element across multiple NUMA node boundaries.

6. The apparatus of claim 1 wherein the streaming application comprises multiple processing element that process data tuples from input data.

7. The apparatus of claim 1 wherein the deployment manager manages deployment of the plurality of operators by instructing an operating system to deploy the operators on the NUMA node processors.

8. The apparatus of claim 7 where the operating system is a Linux operating system.

9. A computer-implemented method executed by at least one processor for deploying processing elements of a streaming application on a non-uniform memory access (NUMA) node comprising:

gathering information of a streaming application having a plurality of processing elements with each processing element having a plurality of operators;

seeking to place the operators of whole processing elements on a single NUMA node;

when deployment of operators of a single processing element placed with threads in separate processors of the NUMA node requires the processing element to cross NUMA node boundaries, then determining whether consolidating threads can increase performance; and in response to a determination of increased performance consolidating two or more operator threads of a processing element and placing all operators of the single processing element on processors of a single NUMA node.

10. The method of claim 9 wherein the gathered information includes a speed of threads of the operators, processor availability on the NUMA nodes, and latency of the NUMA nodes interconnect.

11. The method of claim 9 wherein the step of determining whether consolidating threads can increase performance further comprises determining whether a performance loss from consolidating threads is less than the performance loss from transport latency of the NUMA nodes interconnect.

12. The method of claim 9 further comprising determining consolidating threads does not increase performance, and in response deploying the operators of the processing element across multiple NUMA node boundaries.

13. The method of claim 9 wherein the streaming application comprises multiple processing element that process data tuples from input data.

14. The method of claim 9 wherein deployment of the plurality of operators is accomplished by instructing an operating system to deploy the operators on the NUMA node processors.

15. The method of claim 14 wherein the operating system is a Linux operating system.

16. A computer-implemented method executed by at least one processor for deploying processing elements of a streaming application on a non-uniform memory access (NUMA) node comprising:

gathering information of a streaming application having a plurality of processing elements with each processing element having a plurality of operators, wherein the gathered information includes a speed of threads of the operators, processor availability on the NUMA nodes, and latency of the NUMA nodes interconnect;

seeking to place the operators of whole processing elements on a single NUMA node;

when deployment of operators of a single processing element placed with threads in separate processors of the NUMA node requires the processing element to cross NUMA node boundaries, then determining whether consolidating threads can increase performance by determining whether a performance loss from consolidating threads is less than the performance loss from transport latency of the NUMA nodes interconnect; and in response to a determination of increased performance consolidating two or more operator threads of a processing element and placing all operators of the single processing element on processors of a single NUMA node.

17. The method of claim 16 further comprising determining consolidating threads does not increase performance, and in response deploying the operators of the processing element across multiple NUMA node boundaries.

18. The method of claim 16 wherein the streaming application comprises multiple processing element that process data tuples from input data.

19. The method of claim 16 wherein deployment of the plurality of operators is accomplished by instructing an operating system to deploy the operators on the NUMA node processors.

* * * * *